(12) United States Patent
Tan et al.

(10) Patent No.: US 12,234,910 B2
(45) Date of Patent: Feb. 25, 2025

(54) ELECTRIC SHIFT ACTUATOR

(71) Applicant: Pangeo Technologies Co., Ltd., Changsha (CN)

(72) Inventors: Wenpin Tan, Changsha (CN); Wenfeng Zhou, Changsha (CN); Ziran Zhang, Changsha (CN); Yinye Yang, Changsha (CN); Zhongliang Li, Changsha (CN)

(73) Assignee: Pangeo Technologies Co., Ltd., Changsha (CN)

( * ) Notice: Subject to any disclaimer, the term of this patent is extended or adjusted under 35 U.S.C. 154(b) by 38 days.

(21) Appl. No.: 18/371,516

(22) Filed: Sep. 22, 2023

(65) Prior Publication Data
US 2024/0102554 A1    Mar. 28, 2024

(30) Foreign Application Priority Data
Sep. 27, 2022   (CN) .......................... 202211181091.4

(51) Int. Cl.
     *F16H 63/30*          (2006.01)

(52) U.S. Cl.
     CPC ... *F16H 63/304* (2013.01); *F16H 2063/3056* (2013.01)

(58) Field of Classification Search
     CPC ........................ F16H 63/304; F16H 2063/3056
     USPC ................................................ 74/421 A, 422
     See application file for complete search history.

(56) References Cited

U.S. PATENT DOCUMENTS

| | | | | |
|---|---|---|---|---|
| 3,734,254 A * | 5/1973 | Yanikoshi | ............... | F16D 67/02 192/223.1 |
| 4,944,375 A * | 7/1990 | Ohta | ...................... | B60S 1/163 192/223.2 |
| 6,102,016 A * | 8/2000 | Sitar | ...................... | F02M 26/67 251/129.13 |
| 7,213,482 B2 * | 5/2007 | Minasian | ................ | F16D 43/02 74/421 A |
| 7,252,618 B2 * | 8/2007 | Spakowski | ............ | F02M 26/67 74/89.17 |
| 8,424,406 B2 * | 4/2013 | Wintsch | ................... | G05G 5/04 74/421 A |
| 8,894,163 B2 * | 11/2014 | Gasser | .................... | F16H 21/40 74/421 A |

(Continued)

*Primary Examiner* — Ha Dinh Ho
(74) *Attorney, Agent, or Firm* — Bayramoglu Law Offices LLC

(57) ABSTRACT

An electric shift actuator includes a case body assembly, a case cover assembly covering the case body assembly, and a gear reduction mechanism assembly arranged in the case body assembly. The gear reduction mechanism assembly includes a motor subassembly, a face gear set, a first-stage gear reduction subassembly, and an output gear assembly configured to be connected to a parking mechanism. An output of the motor subassembly meshes with an input of the first-stage gear reduction subassembly in parallel to form first-stage gear reduction transmission, an output of the first-stage gear reduction subassembly vertically meshes with an input of the face gear set to form second-stage gear reduction transmission, and an output of the face gear set meshes with an input of the output gear assembly in parallel to form third-stage gear reduction transmission. The actuator has functions of emergency parking and manual unlocking with improved safety and redundancy.

10 Claims, 11 Drawing Sheets

(56) References Cited

U.S. PATENT DOCUMENTS

2022/0099182 A1\* 3/2022 Hasenkamp ........ F16H 63/3475

\* cited by examiner

ELECTRIC SHIFT ACTUATOR

CROSS REFERENCE TO THE RELATED APPLICATIONS

This application is based upon and claims priority to Chinese Patent Application No. 202211181091.4, filed on Sep. 27, 2022, the entire contents of which are incorporated herein by reference.

TECHNICAL FIELD

The present disclosure relates to the fields of automatic transmissions of motor vehicles, electrified vehicles, switch-by-wire technologies, and the like, and in particular, to an electric shift actuator.

BACKGROUND

An electric shift actuator is mainly configured to output torque for driving condition changes. An electric parking system changes manual parking and unlocking of a conventional gearbox into electrically controlled parking and unlocking, which cancels the mechanical cable connection between the shift handle and the parking mechanism of the gearbox, and replaces the mechanical cable connection with a motor-driven parking mechanism for stable parking.

Currently, the electric parking system includes parking mechanisms such as a pawl and a parking gear inside the gearbox, and an electric shift actuator inside or outside the gearbox. The electric shift actuator drives the parking mechanism to act through rotation or linear motion of an output shaft, so as to achieve shift operations such as parking and releasing the parking. Usually, the electric shift actuator includes a motor, a gear reduction mechanism, a control printed circuit board (PCB), a case cover housing, and other structures. The operation process of the actuator is to control output of the motor after the control PCB receives a parking command, and make the output shaft of the actuator rotate accurately from an angle of a non-parking position (non-P) to an angle of a parking position (P) by the gear reduction mechanism.

Currently, gear reduction mechanisms of most of electric shift actuators use or include a worm gear structure (such as a shift actuator having a manual unlocking function disclosed in patent No. CN111207211A). In this structural arrangement, power flow outputted by the motor needs to be converted to a 90° direction, and a worm gear transmission is used to achieve this conversion, which reduces transmission efficiency and affects output power of the actuator. In addition, there are many parts, and the parts need to be mounted in sequence one by one, and cannot be mounted at the same time, resulting in low production efficiency and indirectly increasing assembly costs.

Moreover, during design, existing electric shift actuators, such as a shift actuator having a manual unlocking function disclosed in Patent No. CN111207211A, are not planned and designed according to modularization, resulting in too many scattered parts that are assembled in an interspersed manner. Because the design of a space is not considered comprehensively, the space is not well utilized, and the resulting structure is not compact enough.

SUMMARY

An objective of the present disclosure is to provide an electric shift actuator, which uses modular design, three-stage transmission and rotation torque output to achieve an electric shift function of a motor vehicle.

The technical solution of the present disclosure is as follows: An electric shift actuator includes a case body assembly, a case cover assembly covering the case body assembly, and a gear reduction mechanism assembly arranged in the case body assembly, where the gear reduction mechanism assembly includes a motor subassembly, a face gear set, a first-stage gear reduction subassembly, and an output gear assembly configured to be connected to a parking mechanism, an output of the motor subassembly meshes with an input of the first-stage gear reduction subassembly in parallel to form first-stage gear reduction transmission, an output of the first-stage gear reduction subassembly vertically meshes with an input of the face gear set to form second-stage gear reduction transmission, and an output of the face gear set meshes with an input of the output gear assembly in parallel to form a third-stage gear reduction transmission structure.

Parallel meshing means that shafts of the two gears meshing with each other are parallel to each other, and vertical meshing means that the shafts of the two gears meshing with each other are perpendicular to each other.

In the above solution, the scattered parts are planned and designed into three component modules: the case body assembly, the case cover assembly, and the gear reduction mechanism assembly, which can be independently assembled to form independent components, and then the components are assembled into a complete machine. This modular assembly makes rational use of space in design and makes the structure more compact. In addition, three-stage transmission is further achieved, which can obtain a larger reduction ratio and also facilitate modification and adjustment of the reduction ratio.

The above face gear set is used in the second-stage transmission, and the face gear set transmission has a larger contact ratio, which can improve the bearing capacity and improve stability of transmission. Point-contact face gear set transmission can ensure transmission at a constant transmission ratio, and the face gear set has smaller vibration and lower noise. In addition, the face gear set can tolerate a larger amount of axial error of the matching cylindrical gear compared to conventional types of the gears as a result of its unique mating features.

Forming third-stage gear reduction transmission can better facilitate adjustment of the transmission ratio, and face gear set transmission is used in the second stage for meshing in the vertical direction can reduce a volume increase caused by an increase of one-stage transmission.

Preferably, the gear reduction mechanism assembly includes a skeleton, the skeleton includes a first housing for mounting the gear reduction mechanism assembly, a second housing for mounting the first-stage gear reduction subassembly, a third housing for mounting the face gear set, and a fourth housing for mounting the output gear assembly, the first housing and the second housing are arranged adjacent to each other and are hollow in axial direction, and the first housing and the second housing are internally connected; the third housing is vertically arranged at an end of the second housing and internally connects with the second housing; the fourth housing is vertically arranged beside the third housing; and the third housing and the fourth housing are hollow in vertical direction.

In structural design, each housing can form a partition to prevent high-speed rotation of the gear from driving grease to splash, and avoid throwing the grease onto a circuit board to cause failure.

Preferably, the motor subassembly includes a motor and a first gear, where the first gear is mounted on a motor output shaft of the motor, and the motor is mounted on the skeleton by a first clip; and the first-stage gear reduction subassembly includes a second gear and a third gear coaxially mounted with the second gear, the first-stage gear reduction subassembly is rotatably mounted in the second housing, the second gear meshes with the first gear, and the third gear meshes with the input of the face gear set.

The motor may be a direct current (DC) brush motor or a brushless motor, depending on an application scenario and a packaging structure of the electric shift actuator.

Preferably, the output gear assembly includes an output gear, a magnet, and a magnet outer sleeve. The output gear is provided with optional sector-shaped teeth to optimize the structure, which mesh with the face gear set, and a shaft portion assembled to the fourth housing is vertically arranged at the other end of the output gear; the shaft portion is provided with a shaft hole, the magnet outer sleeve is sleeved inside an upper end of the shaft hole, and the magnet is arranged at an upper end of the magnet outer sleeve, and is configured to detect the position of the actuator output shaft.

Preferably, a plurality of internal spline teeth distributed circumferentially are arranged in the shaft hole, and a slot width of one of the plurality of internal spline teeth may be greater than slot widths of the remaining internal spline teeth, to identify an angular position of the output shaft for error prevention or poka yoke.

Preferably, the case cover assembly includes a case cover, a printed circuit board (PCB), and a sealing ring, where the PCB is fixed to the case cover, the PCB is arranged adjacent to the magnet, and the case cover is provided with the sealing ring attached to the case body assembly.

Preferably, the case body assembly includes a case body, a vent valve, and a pressure limiting sleeve, where the vent valve is in threaded connection with the case body, and the pressure limiting sleeve is pressed, in an interference fit manner, into the case body.

Preferably, the first-stage gear reduction subassembly is provided with a quincuncial groove that can be manually and emergently unlocked, and a mounting position of the vent valve corresponds to the position of the quincuncial groove.

Preferably, the face gear set includes a face gear and a cylindrical gear arranged on top of the face gear, a first face of the face gear facing the cylindrical gear is provided with first face teeth, the first face teeth mesh with the output of the first-stage gear reduction subassembly, and the cylindrical gear meshes with the input of the output gear assembly.

Preferably, a second face of the face gear away from the cylindrical gear is provided with second face teeth; an optional fourth gear and a backup motor are arranged in the case body assembly; the backup motor is connected to the case body assembly, the fourth gear is mounted on an output shaft of the backup motor, and the fourth gear meshes with the second face teeth.

Compared with related technologies, the present disclosure has the following beneficial effects:

I. The three-stage transmission of the gear reduction mechanism all uses the spur gear structure, which has high transmission efficiency.

II. The electric shift actuator includes three subassemblies: a gear reduction mechanism assembly, a case cover assembly, and a case body assembly, and the assemblies are independent of each other and can be mounted independently, thus facilitating parallel assembly of a production line and improving production efficiency.

III. A backup motor and a fourth gear meshing with a face gear set are additionally arranged, and the face gear set is rotated by driving the backup motor, so that an emergency parking function is achieved, thereby improving the safety and redundancy.

In the figures: 1. Gear reduction mechanism assembly; 2. Case cover assembly; 3. Case body assembly; 4. Bolts; 11. Skeleton; 111. First housing; 112. Second housing; 113. Third housing; 114. Fourth housing; 12. Motor subassembly; 121. Motor; 122. First gear; 13. Face gear set; 131. Face gear; 132. Cylindrical gear; 133. First face teeth; 134. Second face teeth; 14. First-stage gear reduction subassembly; 141. Second gear; 142. First bearing; 143. Shaft retaining ring; 144. Third gear; 145. Quincuncial groove; 15. Output gear assembly; 151. Output gear; 152. Magnet; 153. Magnet outer sleeve; 16. X ring; 17. First clip; 18. Second bearing; 19. Snap spring; 20. Second clip; 21. Case cover; 22. First PCB; 23. Sealing ring; 31. Case body; 32. Vent valve; 33. Pressure limiting sleeve; 34. O-ring; 35. Fourth gear; 36. Backup motor; 37. Second PCB.

DETAILED DESCRIPTION OF THE EMBODIMENTS

The present disclosure will be described in detail below with reference to the accompanying drawings and the embodiments. It should be noted that embodiments in the present disclosure or features in the embodiments may be combined with one another without conflict. For ease of description, if the words "up", "down", "left" and "right" appear below, they only indicate that they are the same as the up, down, left and right directions of the accompanying drawings themselves, and do not limit the structure.

Figure 1:
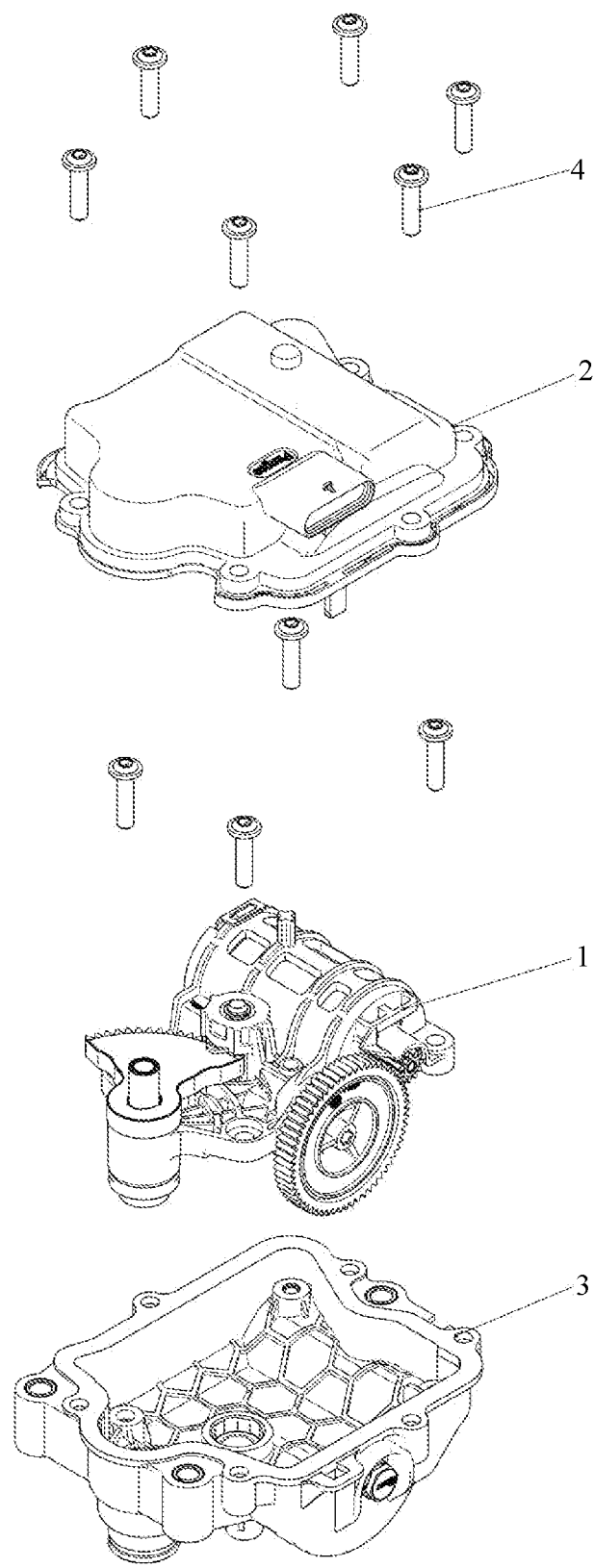
FIG. 1 is a schematic diagram of an exploded structure of an electric shift actuator according to the present disclosure.

As shown in FIG. 1, an electric shift actuator according to this embodiment includes case body assembly 3, case cover assembly 2 covering the case body assembly 3, and gear reduction mechanism assembly 1 arranged in the case body assembly 3. Therefore, the parts are designed as three modules, which can be assembled separately and then mounted integrally, so that the structure is more compact.

Figure 3:
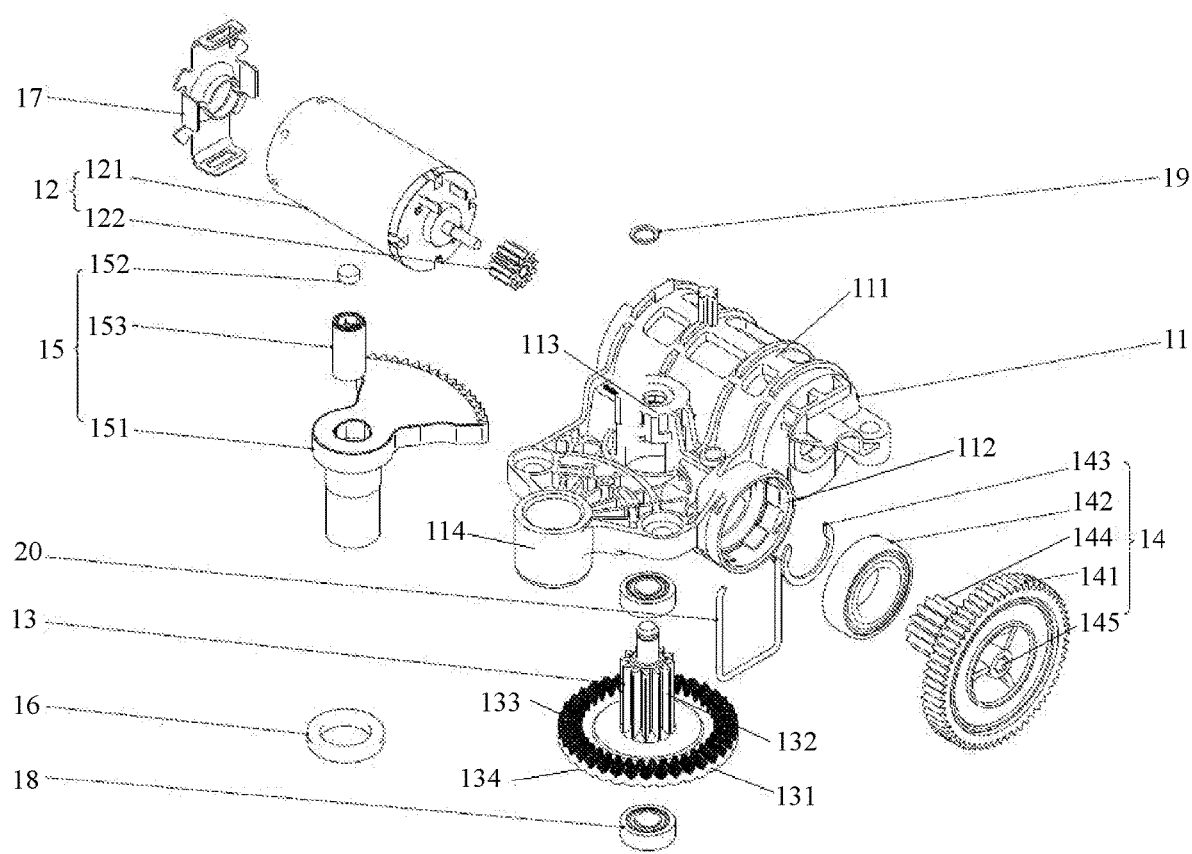
FIG. 3 is a schematic diagram of an exploded structure of a gear reduction mechanism assembly.

As shown in FIG. 3, the gear reduction mechanism assembly 1 includes motor subassembly 12, face gear set 13, first-stage gear reduction subassembly 14, and output gear assembly 15 configured to be connected to a parking mechanism. An output of the motor subassembly 12 meshes with an input of the first-stage gear reduction subassembly 14 in parallel to form first-stage gear reduction transmission, an output of the first-stage gear reduction subassembly 14 vertically meshes with an input of the face gear set 13 to form second-stage gear reduction transmission, and an output of the face gear set 13 meshes with an input of the output gear assembly 15 in parallel to form third-stage gear reduction transmission.

The three-stage transmission formed above can obtain a larger reduction ratio, and also facilitate modification and adjustment of the reduction ratio.

Figure 2:
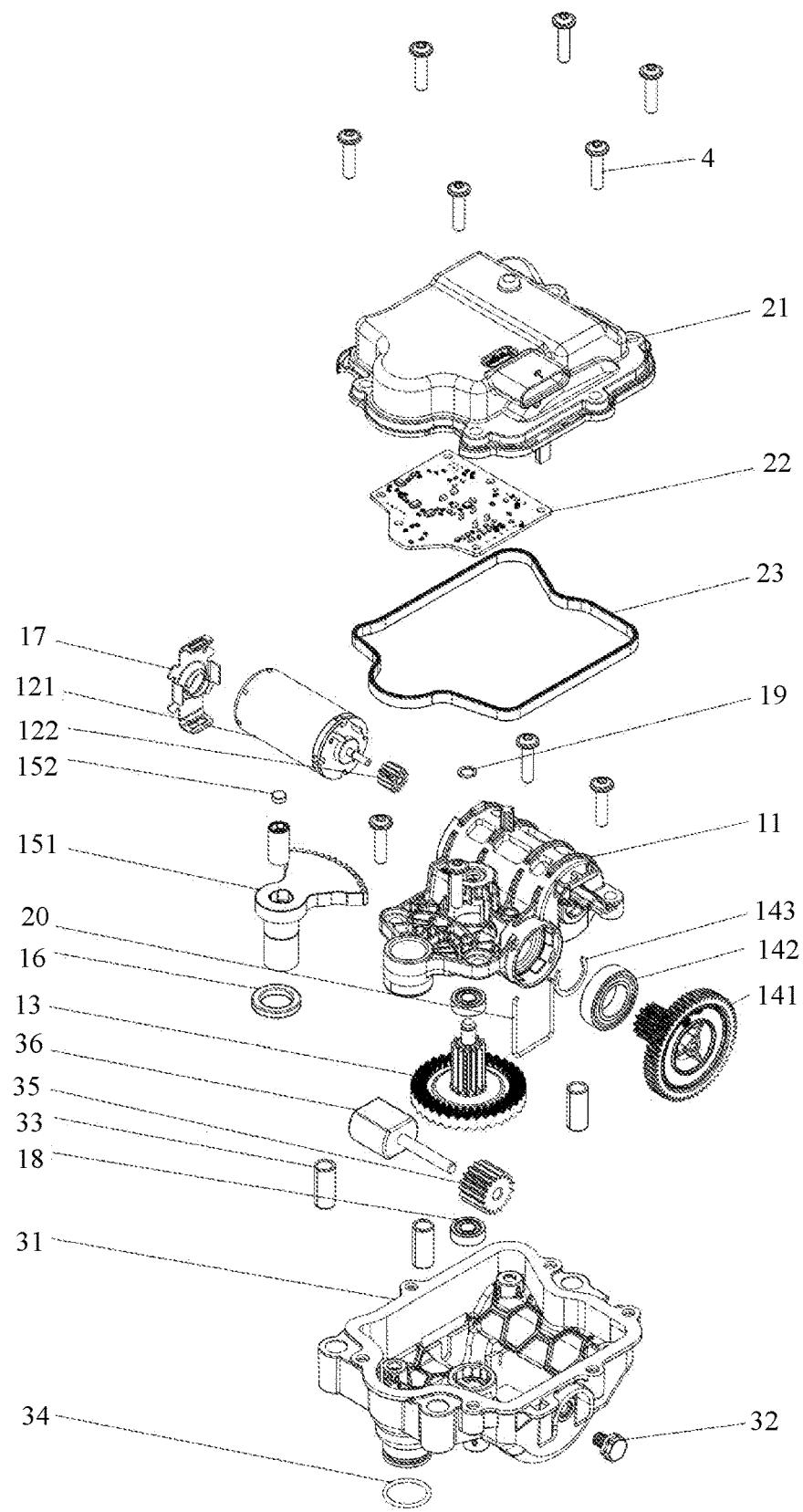
FIG. 2 is a schematic diagram of a fully exploded structure of an electric shift actuator according to the present disclosure.

Specifically, as shown in FIG. 2, the gear reduction mechanism assembly 1 includes skeleton 11, motor subassembly 12, face gear set 13, first-stage gear reduction subassembly 14, output gear assembly 15, and X ring 16.

Figure 5:
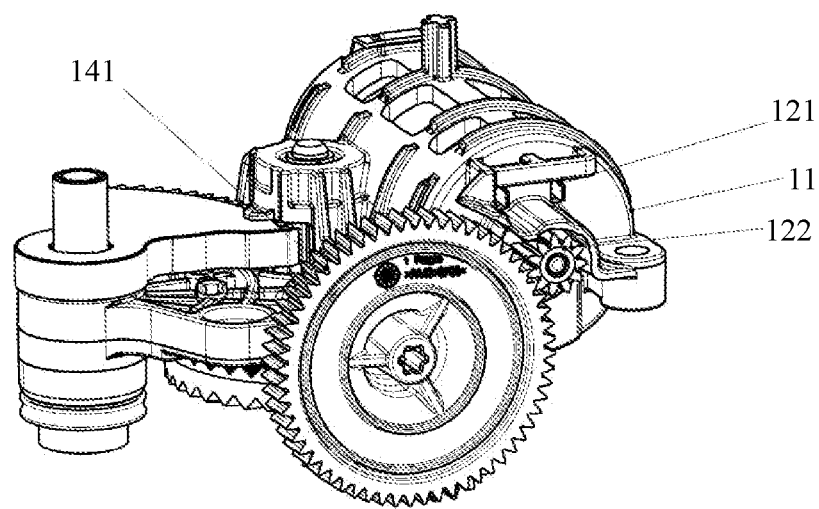
FIG. 5 is a schematic diagram showing mounting of a gear reduction mechanism assembly to a skeleton.

As shown in FIGS. 3 and 5, the skeleton 11 is preferably made of plastic, and includes first housing 111 for mounting the gear reduction mechanism assembly 1, second housing 112 for mounting the first-stage gear reduction subassembly 14, third housing 113 for mounting the face gear set 13, and fourth housing 114 for mounting the output gear assembly 15, the first housing 111 and the second housing 112 are arranged adjacent to each other and are hollow in axial direction, and the first housing 111 and the second housing 112 are internally connected; the third housing 113 is vertically arranged at an end of the second housing 112 and internally connects with the second housing 112; the fourth housing 114 is vertically arranged beside the third housing 113; and the third housing 113 and the fourth housing 114 are hollow in vertical direction. Assemblies are separated by the housings, which can prevent high-speed rotation of the gear from driving grease to splash, and avoid throwing the grease onto a PCB to cause failure.

As shown in FIGS. 2 and 5, the motor subassembly 12 includes motor 121 and first gear 122. The motor 121 is mounted on the skeleton 11 by first clip 17, which makes the mounting reliable and the disassembly convenient and achieves low costs. The motor 121 is a brush motor, and the first gear 122 is a spur gear. The first gear 122 is pressed into a motor shaft of the motor 121 through interference, so that the first gear 122 rotates under the driving of the motor shaft. The motor subassembly 12 is fixed to the skeleton 11 by the first clip 17. In a specific embodiment, the first clip 17 is an elastic metal clip, which has a C-shaped structure in both horizontal and vertical sections, with two horizontal side edges clamped to the motor 121, and two vertical side edges provided with clamping grooves that are clamped with corresponding bumps arranged on the first housing 111 of the skeleton 11. A shaft edge assembled to the motor 121 protrudes in the middle of the first clip 17.

As shown in FIGS. 2 and 3, the first-stage gear reduction subassembly 14 is fixed to the second housing 112 by U-shaped second clip 20, which makes the mounting reliable and the disassembly convenient. The first-stage gear reduction subassembly 14 includes second gear 141, first bearing 142, shaft retaining ring 143, third gear 144, and quincuncial groove 145. A shaft of the second gear 141 is rotatably mounted in the second housing 112 by the first bearing 142, and an axial movement of the second gear 141 in the second housing 112 is limited by the shaft retaining ring 143. The second clip 20 is clamped to the shaft of the second gear 141 and the second housing 112 to limit the axial movement of the second gear 141 in the second housing 112. The third gear 144 and the second gear 141 are coaxially mounted. The center of the second gear 141 is provided with the quincuncial groove 145, and the quincuncial groove 145 is located on an opposite side of the shaft of the second gear 141.

The face gear set 13 includes face gear 131 and cylindrical gear 132 arranged on top of the face gear 131, a first face of the face gear 131 facing the cylindrical gear 132 is provided with first face teeth 133, and a second face thereof away from the cylindrical gear 132 is provided with second face teeth 134. The face gear set 13 is vertically and rotatably mounted in the third housing 112 by two second bearings 18, and the face gear set 13 is fixed to the third housing 112 of the skeleton 11 by snap spring 19. The cylindrical gear 132 has no axial force, which can simplify the support for the cylindrical gear 132. In addition, the transmission of the face gear 131 has a large contact ratio, which can provide the stability of transmission.

Figure 4:
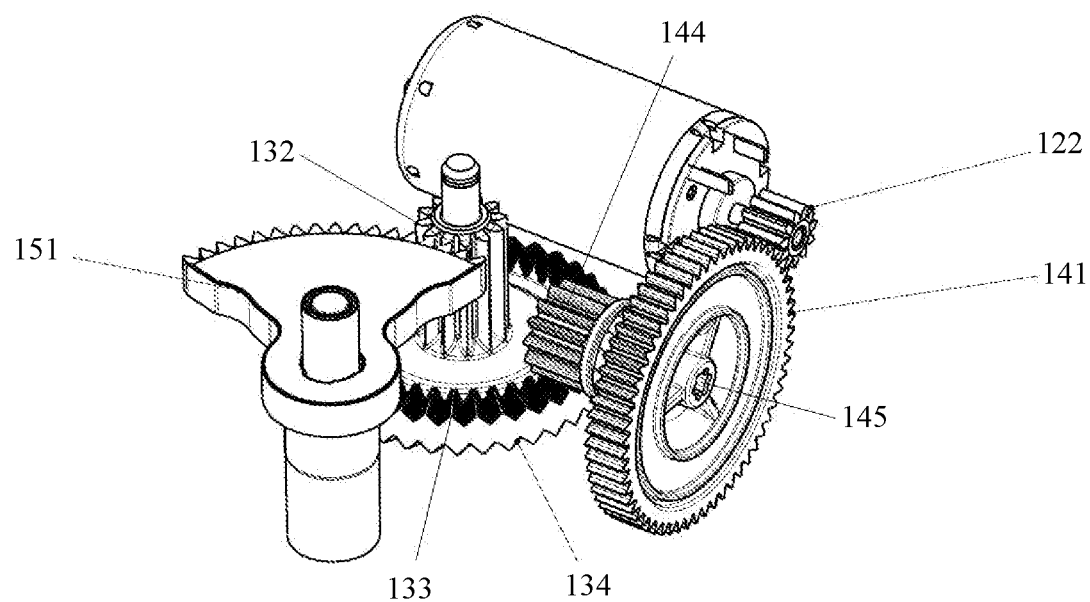
FIG. 4 is a schematic diagram showing mounting of three-stage gear reduction transmission.

As shown in FIG. 4, the first face teeth 133 mesh with the third gear 144, and the cylindrical gear 132 meshes with output gear 151 of the output gear assembly 15.

As shown in FIG. 3, the output gear assembly 15 includes output gear 151, magnet 152, and magnet outer sleeve 153. The output gear 151 is preferably provided with sector-shaped teeth, and a shaft portion is vertically arranged at the other end of the output gear. The sector-shaped teeth form an input and mesh with the cylindrical gear 132, and the shaft portion forms an output, penetrates and is sleeved on the fourth housing 114 and then is in driving connection with a parking mechanism (not shown). The output gear 151 is mounted on the skeleton 11 by the X ring 16 sleeved on the shaft portion, and the X ring 16 is configured for internal sealing of the electric shift actuator.

Figure 6:
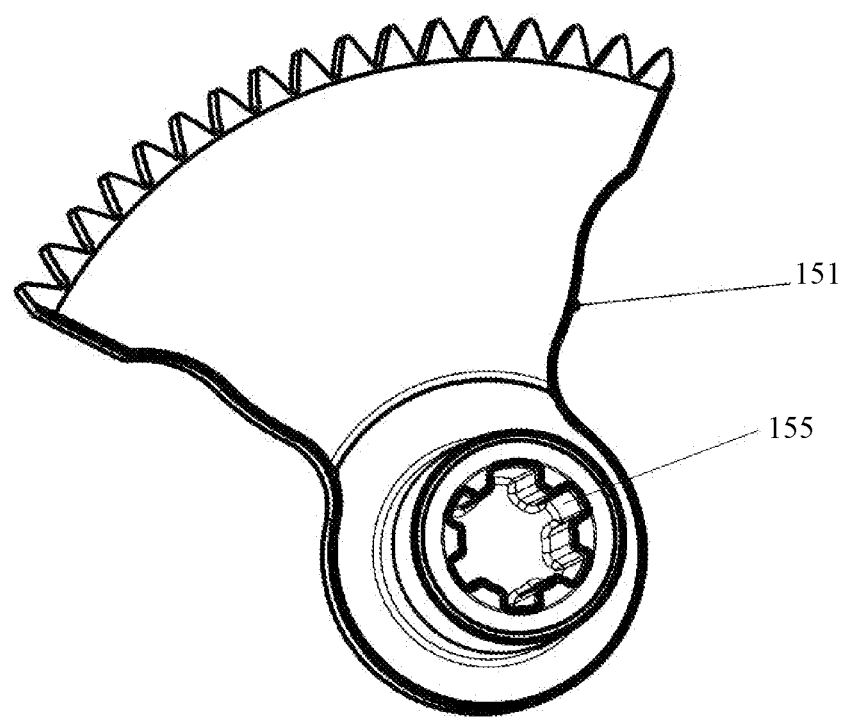
FIG. 6 is a schematic structural diagram of an output gear in an output gear assembly.

As shown in FIG. 6, a port for driving the parking mechanism is added to the output gear assembly 15. Specifically, an end of the output gear 151 provided with the shaft portion is provided with a hollow shaft hole, and the magnet outer sleeve 153 is sleeved inside an upper end of the shaft hole. A plurality of internal spline teeth 155 distributed circumferentially are arranged in the shaft hole, and in this embodiment, there are six internal spline teeth. The structure of the parking mechanism assembled to the output gear assembly 15 is also provided with six spline teeth, but there are position restrictions in assembly of the parking mechanism to the output gear assembly 15. Therefore, a slot width of one of the six internal spline teeth 155 is greater than slot widths of the remaining five internal spline teeth 155, so that directional assembly can be formed by the internal spline teeth 155 with the large width, and the position error after assembly can be avoided, to achieve the foolproof effect. It should be noted that an output port of the output gear assembly 15 may have other different self-defined structures, such as a square groove, a star groove, and a quincuncial groove. Depending on a vehicle application, the output port may be equipped with an error-proof structure or no error-proof structure.

The magnet 152 is arranged at an upper end of the magnet outer sleeve 153. The magnet 152 is configured to provide a magnetic field for a Hall sensor in the PCB. The magnet 152 may rotate with the output gear 151, the magnetic field of the rotating magnet 152 may change, and a rotation angle of the output gear 151 can be obtained by means of this change.

As shown in FIG. 4, the first gear 122 meshes with the second gear 141 to form first-stage transmission, the third gear 144 meshes with the first face teeth 133 of the face gear 131 to form second-stage transmission, and the cylindrical gear 132 meshes with the output gear 151 to form third-stage transmission.

Figure 7:
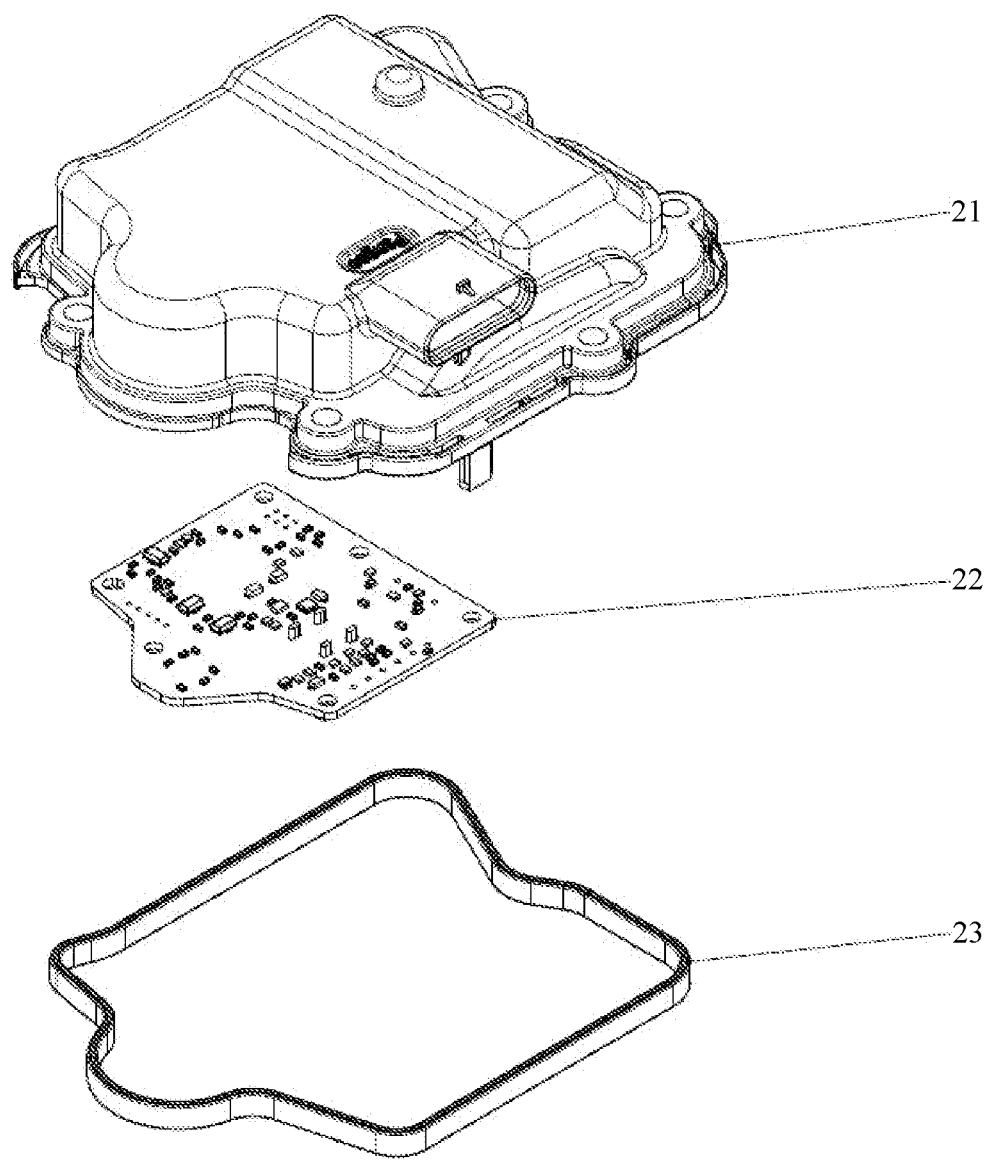
FIG. 7 is a schematic structural diagram of a first embodiment of a case cover assembly.

FIG. 7 is a schematic structural diagram of a case cover assembly with a controller. The case cover assembly 2 includes case cover 21, first PCB 22, and optional sealing ring 23. The first PCB 22 is fixed to the case cover 21 by hot riveting. The first PCB 22 is provided with a Hall sensor chip, which fitted with the magnet 152. When the output gear 151 is in transmission, the Hall sensor chip can obtain the rotation angle of the output gear 151 by the magnet. The case cover 21 is optionally provided with sealing ring 23 that can be attached to the case body assembly 3. Under harsh environmental conditions such as high humidity and near the ground, the sealing ring 23 can be waterproof, dustproof and prevent chemical elements such as motor vehicle oil from being immersed.

Figure 10:
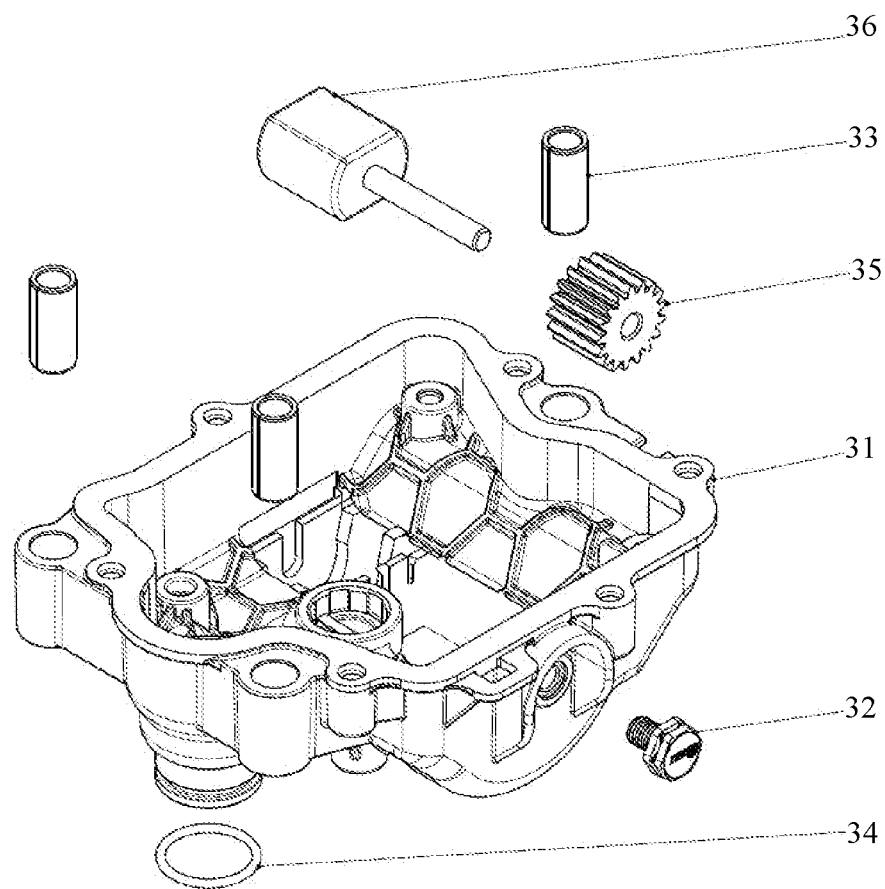
FIG. 10 is a schematic structural diagram of a second embodiment of a case body assembly.
Figure 11:
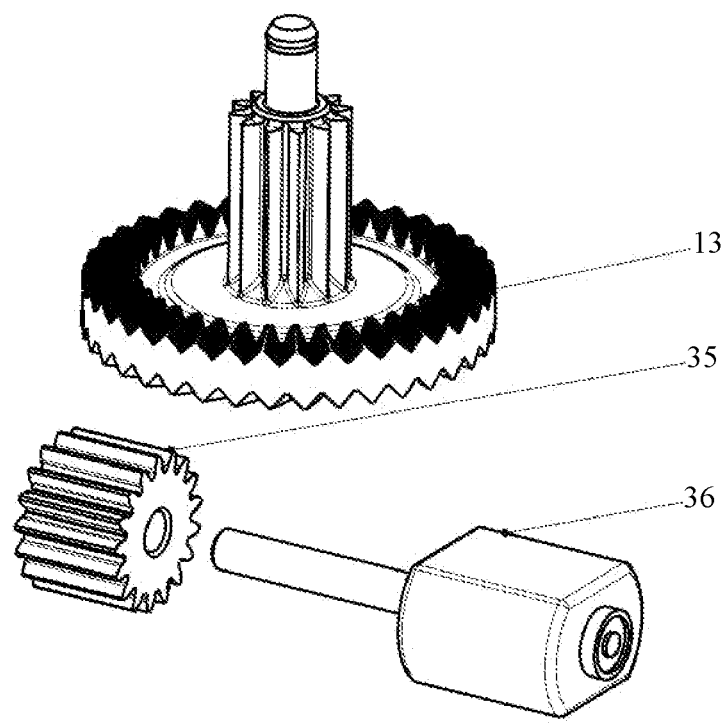
FIG. 11 is a schematic diagram of an emergency parking structure.

The first PCB is integrated with a microprocessor controller, and can receive instructions of a full vehicle to control the motor to park and release the parking. Specifically, as shown in FIGS. 2, 10 and 11, the case body assembly 3 adapted to FIG. 7 includes case body 31, vent valve 32, pressure limiting sleeve 33, O-ring 34, fourth gear 35, and backup motor 36. The case body assembly 3 is configured to mount the gear reduction mechanism assembly 1, and the O-ring 34 is arranged on a port for the case body assembly 3 to be fitted with a reduction box (not shown), to seal the electric shift actuator to the reduction box or a brake transmission case body. The vent valve 32 is in threaded connection with the case body 31, and the pressure limiting sleeve 33 is pressed, in an interference fit manner, into the case body 31. As shown in FIG. 2, bolt 4 passes through a through hole in the case cover 21 and is in threaded connection with the pressure limiting sleeve 33 to connect the case cover assembly 2 and the case body assembly 3 as a whole.

By providing the quincuncial groove 145 in the second gear 141 and providing the quincuncial groove 145 corresponding to the vent valve 32, a manually unlocked channel can be formed by using a threaded hole for mounting the vent valve 32, so that there is no need to re-drill a hole for operating the quincuncial groove 145, and there is no need to worry about the problem of how to implement waterproof sealing. Operation steps are as follows: The vent valve 32 is first unscrewed by a socket wrench, then a Torx screwdriver passes through the threaded hole in the case body 31 for mounting the vent valve 32 and is inserted into the quincuncial groove 145, and the second gear 141 is rotated to achieve emergency unlocking.

As shown in FIGS. 2 and 3, the backup motor 36 is mounted inside the case body assembly 3 by screws, the fourth gear 35 is mounted on the output shaft of the backup motor 36, and the fourth gear 35 meshes with the second face teeth 134. When the main motor 121 cannot operate, the face gear set 13 can be rotated by driving the backup motor 36, so that emergency parking is achieved, thereby improving the safety and redundancy of a system.

Figure 8:
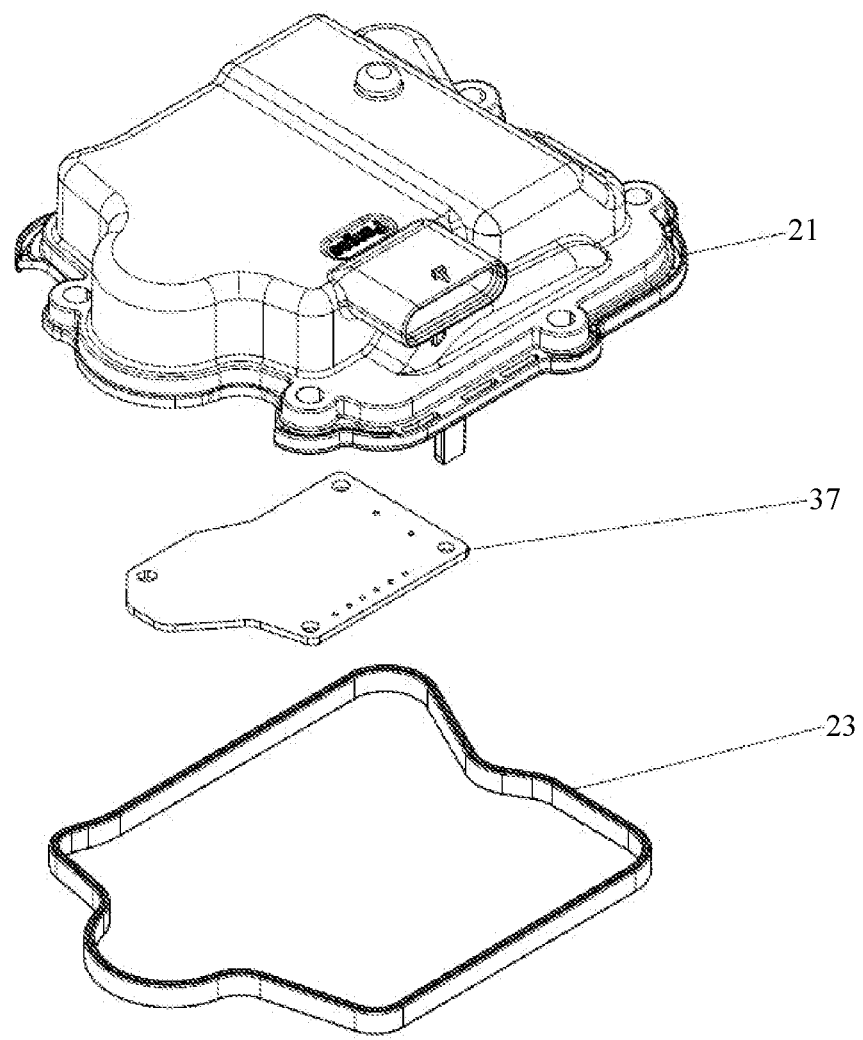
FIG. 8 is a schematic structural diagram of a second embodiment of a case cover assembly.
Figure 9:
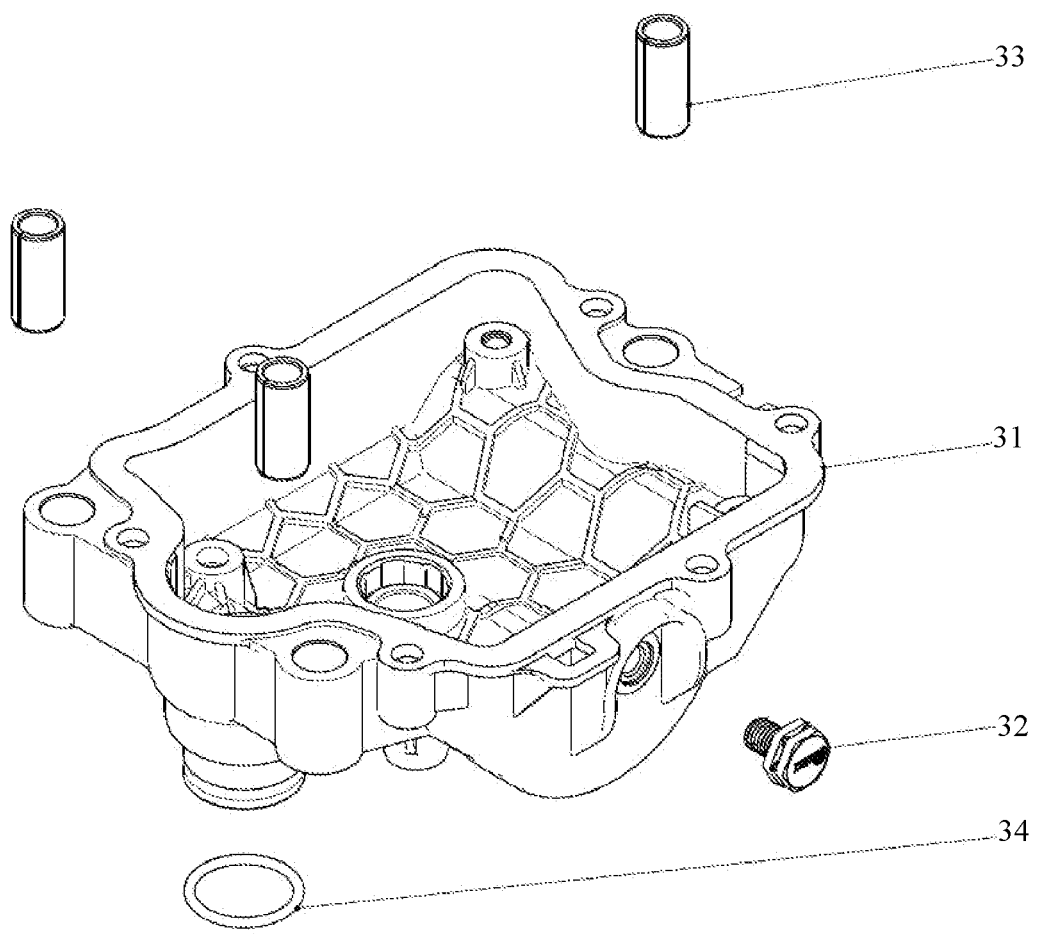
FIG. 9 is a schematic structural diagram of a first embodiment of a case body assembly.

FIG. 8 is a schematic structural diagram of a case cover assembly without a controller. Different from that of FIG. 7, the case cover assembly 2 of FIG. 8 includes second PCB 37. The second PCB 37 only outputs a sensor position signal, and cannot perform parking and unlocking control. As shown in FIGS. 9, the case body assembly 3 adapted to FIG. 8 includes case body 31, vent valve 32, pressure limiting sleeve 33, and O-ring 34. The assembly relationship of the above structure is the same as that of FIG. 10. The PCBs of two specifications can share a case cover body without modifying other parts, thereby improving universality.

The foregoing is merely examples of the present disclosure and does not constitute a limitation on the scope of the present disclosure. Any equivalent structure or equivalent process change made by using the description and the accompanying drawings of the present disclosure, or direct or indirect application thereof in other related technical fields, shall still fall in the protection scope of the patent of the present disclosure.

What is claimed is:

1. An electric shift actuator, comprising a case body assembly, a case cover assembly covering the case body assembly, and a gear reduction mechanism assembly arranged in the case body assembly, wherein the gear reduction mechanism assembly comprises a motor subassembly, a face gear set, a first-stage gear reduction subassembly, and an output gear assembly, wherein the output gear assembly is configured to be connected to a parking mechanism, an output of the motor subassembly meshes with an input of the first-stage gear reduction subassembly in parallel to form first-stage gear reduction transmission, an output of the first-stage gear reduction subassembly vertically meshes with an input of the face gear set to form second-stage gear reduction transmission, and an output of the face gear set meshes with an input of the output gear assembly in parallel to form a third-stage gear reduction transmission structure.

2. The electric shift actuator according to claim 1, wherein the gear reduction mechanism assembly comprises a skeleton, wherein the skeleton comprises a first housing for mounting the gear reduction mechanism assembly, a second housing for mounting the first-stage gear reduction subassembly, a third housing for mounting the face gear set, and a fourth housing for mounting the output gear assembly, wherein the first housing and the second housing are arranged adjacent to each other and are hollow in axial direction, and the first housing and the second housing are internally connected; the third housing is vertically arranged at an end of the second housing and internally connects with the second housing; the fourth housing is vertically arranged beside the third housing; and the third housing and the fourth housing are hollow in vertical direction.

3. The electric shift actuator according to claim 2, wherein the motor subassembly comprises a motor and a first gear, wherein the first gear is mounted on a motor shaft of the motor, and the motor is mounted on the skeleton by a first clip; and
the first-stage gear reduction subassembly comprises a second gear and a third gear coaxially mounted with the second gear, wherein the first-stage gear reduction subassembly is rotatably mounted in the second housing, the second gear meshes with the first gear, and the third gear meshes with the input of the face gear set.

4. The electric shift actuator according to claim 2, wherein the output gear assembly comprises an output gear, a magnet, and a magnet outer sleeve, wherein the output gear is provided with sector-shaped teeth, wherein the sector-shaped teeth mesh with the face gear set, and a shaft portion assembled to the fourth housing is vertically arranged at the other end of the output gear; the shaft portion is provided with a shaft hole, the magnet outer sleeve is sleeved inside an upper end of the shaft hole, and the magnet is arranged at an upper end of the magnet outer sleeve.

5. The electric shift actuator according to claim 4, wherein a plurality of internal spline teeth distributed circumferentially are arranged in the shaft hole, and a slot width of one of the plurality of internal spline teeth is greater than slot widths of the remaining internal spline teeth.

6. The electric shift actuator according to claim 4, wherein the case cover assembly comprises a case cover, a printed circuit board (PCB), and a sealing ring, wherein the PCB is fixed to the case cover, the PCB is arranged adjacent to the magnet, and the case cover is provided with the sealing ring attached to the case body assembly.

7. The electric shift actuator according to claim 1, wherein the case body assembly comprises a case body, a vent valve, and a pressure limiting sleeve, wherein the vent valve is in threaded connection with the case body, and the pressure limiting sleeve is pressed, in an interference fit manner, into the case body.

8. The electric shift actuator according to claim 7, wherein the first-stage gear reduction subassembly is provided with an unlockable structure, wherein the unlockable structure comprises a quincuncial groove; and a mounting position of the vent valve corresponds to a position of the quincuncial groove.

9. The electric shift actuator according to claim 1, wherein the face gear set comprises a face gear and a cylindrical gear arranged on top of the face gear, wherein a first face of the face gear is provided with first face teeth, wherein the first face of the face gear faces the cylindrical gear; the first face teeth mesh with the output of the first-stage gear reduction subassembly, and the cylindrical gear meshes with the input of the output gear assembly.

10. The electric shift actuator according to claim 9, wherein a second face of the face gear is provided with second face teeth, wherein the second face of the face gear is away from the cylindrical gear; a fourth gear and a backup motor are arranged in the case body assembly; the backup motor is connected to the case body assembly, the fourth gear is mounted on an output shaft of the backup motor, and the fourth gear meshes with the second face teeth.

* * * * *